(12) United States Patent
Nishida et al.

(10) Patent No.: US 7,381,358 B2
(45) Date of Patent: Jun. 3, 2008

(54) POLYESTER RESIN AND RESIN COMPOSITION FOR MOLDING, AND FORMED PRODUCT THEREOF

(75) Inventors: Mitsuo Nishida, Ohtsu (JP); Osamu Iritani, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 281 days.

(21) Appl. No.: 10/863,342

(22) Filed: Jun. 9, 2004

(65) Prior Publication Data

US 2004/0222564 A1 Nov. 11, 2004

Related U.S. Application Data

(63) Continuation of application No. 10/244,032, filed on Sep. 16, 2002, now abandoned.

(30) Foreign Application Priority Data

Sep. 18, 2001 (JP) .............................. 2001-283880

(51) Int. Cl.
*B29C 45/14* (2006.01)
(52) U.S. Cl. .............................. 264/272.11; 264/328.1
(58) Field of Classification Search ............. 264/328.1, 264/272.11
See application file for complete search history.

(56) References Cited

U.S. PATENT DOCUMENTS

| 3,954,689 | A | | 5/1976 | Hoeschele |
| 4,254,001 | A | * | 3/1981 | Tung ........................ 528/295.3 |
| 4,414,171 | A | * | 11/1983 | Duffy et al. ................. 264/249 |
| 4,528,219 | A | * | 7/1985 | Yamada et al. ............. 428/36.6 |
| 5,969,056 | A | * | 10/1999 | Nava .......................... 525/437 |
| 6,441,741 | B1 | * | 8/2002 | Yoakum ................... 340/572.8 |

FOREIGN PATENT DOCUMENTS

| EP | 0 307 665 A2 | 3/1989 |
| EP | 0 919 363 | 6/1999 |
| EP | 1 052 595 B1 | 11/2000 |
| JP | 51-037933 | 3/1976 |
| JP | 57-091647 | 6/1982 |
| JP | 5 051520 | 8/1991 |
| JP | 07-070535 | 3/1995 |
| JP | 11 323110 | 11/1999 |
| JP | 2000-128966 | 5/2000 |
| JP | 2000-133665 | 5/2000 |
| JP | 2000-239349 | 9/2000 |
| JP | 2002-263187 | 10/2002 |

OTHER PUBLICATIONS

Machine translation of EP 1 052 595.*
Van Berkel et al. "Developments in Polyether-ester and Polyester-ester Segmented Copolymers" Pesticide Science, 1982, pp. 261-310.
El Fray et al. "Synthesis and Properties of Multiblock Ester-Aliphatic-Ether Terpolymers" KGK Kautschuk Gummi Kunststoffe 59, Jahrgang, No. 10/96, pp. 692-697.
Manuel et al., "Segmented Block Copolymers Based on Poly(butylene Terephthalate) and Telechelic Polyesters and Polyamides of Dimerized Fatty Acids" Polymer, 1993, vol. 34, No. 20, pp. 4325-4329.
"List of Organic Insoluble Type Copolyester"2002.
K. Yuki, "Saturated Polyester Resin Handbook," 1989.
English translation of Japanese Office Action, mailed Oct. 23, 2003, "Notice of Ground of Rejection", Patent Application No. 2002-263187.
Japanese Patent Office Communication dated Mar. 15, 2007, directed at counterpart JP application No. 2002-263187.
Nordson, "Hot-Melt Molding," pp. 1-6 (partial translation), 1999.
Hirose et al. (1984). "Polyester Based Hot-Melt Adhesive (II)." pp. 11(347)-18(354) (partial translation).

* cited by examiner

*Primary Examiner*—Monica A. Huson
(74) *Attorney, Agent, or Firm*—Morrison & Foerster LLP

(57) ABSTRACT

In a saturated polyester resin or a composition with the saturated polyester resin as the main component for molding, the melt viscosity at 200° C. is at least 5 dPa·s and not more than 1000 dPa·s, and the product a×b is at least 500 where a (N/cm$^2$) is the tensile breaking strength and b (%) is the tensile breaking elongation of a film shape formed product. Preferably, the polyester resin has a glass transition temperature of not more than −10° C., a melting point of at least 70° C. and not more than 200° C., and an ester group concentration of at least 1000 equivalents/10$^6$ g and not more than 8000 equivalents/10$^6$ g. A material superior in water resistance, electrical insulation, durability, working environment and productivity as a molding material for an electric electronic component having a sophisticated configuration is provided.

13 Claims, No Drawings

POLYESTER RESIN AND RESIN COMPOSITION FOR MOLDING, AND FORMED PRODUCT THEREOF

CONTINUING DATA

This application is a Continuation of U.S. patent application Ser. No. 10/244,032, filed 16 Sep. 2002, now abandoned.

BACKGROUND OF THE INVENTION

1. Field of the Invention

The present invention relates to polyester resins and resin compositions directed to molding, and a formed product using the same. The polyester resins and resin compositions of the present invention are particularly suitable for low pressure molding applications to secure electrical electronic components in a waterproof manner.

2. Description of the Background Art

Electrical electronic components widely used in the field of vehicles and electrical appliances must be electrically insulated in order to achieve the usage objective. For example, electric wires are covered with a resin that has electrical insulation. Reflecting the growing demand for incorporating many more sophisticated electrical components in a restricted small region such as cellular phones during the past several years, various approaches for electrical insulation thereof have been employed. Particularly in the case where resins and the like corresponding to an electrical insulator are to be molded for a product that has a complicated configuration such as a circuit board, a technique to be consistent with the critical configuration is required. For this purpose, the technique of reducing the viscosity of the resin during covering is generally employed. One known method of reducing the viscosity is to impregnate the electrical electronic component with a resin that is dissolved in a solvent to take a liquid form, and then vaporizing the solvent. However, this method had various problems such as bubbles remaining when the solvent is vaporized as well as degrading the working environment if an organic solution is used as the solvent.

Conventionally, a two-part epoxy resin has been used in view of also the durability after molding, as disclosed in various publications such as Japanese Patent Laying-Open No. 2000-239349 and EP 0 307 665 A2. Specifically, a base resin and a curing agent are mixed immediately before the molding process at a predetermined ratio, molded at low viscosity, warmed and then left for several days to promote cure reaction and be completely solidified. However, it is known that this method imposes various problems such as the adverse effect of the epoxy towards the environment, requiring accurate adjustment of the mixing ratio of the two liquids, and the short available period of time prior to mixing being restricted to only one to two months. Low productivity is also noted due to the requirement of a cure period of several days for hardening. Furthermore, there was a problem of the stress caused by contraction in the resin after curing being concentrated at an area where the physical strength is relatively weak such as at the solder portion bonding an electrical electronic component and the wiring to cause delamination threat.

As a substitute for the two-part epoxy resin that has been conventionally used despite the above-described problems, the hot melt type resin can be cited as the resin for molding. The problems associated with the working environment based on the usage of the solvent containing type and epoxy based type are overcome in the hot melt adhesive that requires only the resin to be heated and melted in order to reduce the viscosity for molding. Since the hot melt type resin is solidified by just being cooled after molding to express its capability, the productivity is increased. Because it is noted that a thermoplastic resin is generally employed, recycling of the material when ended as a product is allowed by heating and removing the resin by melting. The reason why a hot metal type resin having high potentiality as a resin for molding has not become the material to replace the conventionally-used two-part epoxy resin is due to the fact that a base material suitable therefor has not been proposed.

For example, the relatively economic EVA (Ethylene Vinyl Acetate) which is known as a hot melt type has insufficient heat resistance and durability in the environment where an electrical electronic component is used. The inclusion of various additives to express adhesion may contaminate the electrical electronic component to reduce the electrical performance. Thus, EVA is not suitable. Polyamide that is another hot melt type has high adhesion towards various substrates as a resin without any additives, and is suitable as a resin material for low-pressure molding by virtue of its low melt viscosity and high cohesive force, as disclosed in, for example, EP 1 052 595 B1. However it is known that polyamide is basically highly hygroscopic and will gradually absorb moisture. Electrical insulation which is one of the most important property is often degraded over time.

Polyester that has high electrical insulation and water resistance can be thought of as an extremely useful material for the present application. However, the melt viscosity is generally high. During the molding process for a sophisticated component, an injection molding step at a high pressure of at least several thousand $N/cm^2$ will be required. There is a possibility of the electrical electronic components being fractured during the molding process.

Thus, a base material that meets the requirements of various capabilities as a resin for molding directed to electrical electronic components having complicated configurations was not conventionally proposed.

SUMMARY OF THE INVENTION

An object of the present invention is to provide a base material that meets the requirements of various capabilities such as waterproof, electrically insulation, working environment, productivity, durability and the like for a polyester resin or a resin composition for molding directed to an electrical electronic component having a sophisticated configuration.

To achieve the above object, the present invention includes a polyester resin for molding, a resin composition for molding, and a formed product using the same.

According to an aspect, the present invention is a saturated polyester resin for molding, wherein the melt viscosity at 200° C. is at least 5 dPa·s and not more than 1000 dPa·s, and the product of a×b is at least 500, where a ($N/mm^2$) is the tensile breaking strength and b (%) is the tensile breaking elongation of a film-shape formed product.

According to another aspect, the present invention is a saturated polyester resin for molding, wherein the glass transition temperature is not more than −10° C., and the melting point is at least 70° C. and not more than 200° C.

According to a further aspect, the present invention is a saturated polyester resin for molding, wherein the ester group concentration of polyester is at least 1000 equivalents/$10^6$ g and not more than 8000 equivalents/$10^6$ g.

According to still another aspect, the present invention is a saturated polyester resin for molding, wherein at least 2 mole % of a diol component of polyester is a polyalkylene glycol when total amounts of a diol component of the polyester is 100 mole %. Preferably, the polyalkylene glycol is a polytetramethylene glycol having a number-average molecular weight of at least 400 and not more than 10000.

According to a still further aspect, the present invention is a saturated polyester resin for molding, wherein at least 2 mole % of a diol component of polyester is an aliphatic and/or alicyclic diol having at least 10 carbon atoms when total amounts of a diol component of the polyester is 100 mole %.

According to yet a further aspect, the present invention is a saturated polyester resin for molding, wherein at least 2 mole % of a dicarboxylic acid of polyester is an aliphatic and/or alicyclic dicarboxylic acid having at least 10 carbon atoms when total amounts of a dicarboxylic acid component of the polyester is 100 mole %.

Preferably in the above aspect, at least 60 mole % of the dicarboxylic acid is a terephthalic acid and/or naphthalene dicarboxylic acid, and at least 40 mole % of the diol component is a 1,4-butanediol and/or ethylene glycol when respective total amounts of the dicarboxylic acid component and the diol component of the polyester are 100 mole %.

In the above aspect, the present invention is preferably a polyester resin composition for molding, including at least 50% by weight of a saturated polyester resin among the entire amount. Also, the present invention is preferably a polyester resin composition for molding, including the above saturated polyester resin and an anti-oxidant.

According to yet another aspect, the present invention is a polyester resin composition for molding, wherein the retention of the melt viscosity after a heat treatment test for 100 hours at 121° C. and 0.2 MPa is at least 70% to the melt viscosity prior to being subjected to the heat treatment test.

According to yet a still further aspect, the present invention is a polyester resin composition for molding, wherein the melt viscosity at 200° C. is at least 5 dPa·s and not more than 1000 dPa·s, and the product of a×b is at least 500 where a (N/mm$^2$) is the tensile breaking strength and b (%) is a tensile breaking elongation of a film-shape formed product.

Also, the present invention is preferably a formed product using a saturated polyester resin or a polyester resin composition for molding of the above respective aspects.

The foregoing and other objects, features, aspects and advantages of the present invention will become more apparent from the following detailed description of the present invention.

DESCRIPTION OF THE PREFERRED EMBODIMENTS

"Molding" in the present specification refers to molding injected at the low pressure of 10 N/cm$^2$ to 800 N/cm$^2$. The molding process is carried out at an extremely low pressure as compared to injection molding carried out at a high pressure of the average of approximately 4000 N/cm$^2$ conventionally employed for general plastic molding. The principle is similar to that of general injection molding, wherein a melted resin is injected to a mold cavity in which an electrical electronic component is set to encapsulate the component. Over molding can be effected without fracturing the delicate component.

The polyester resin for molding of the present invention has a melt viscosity of at least 5 dPa·s and not more than 1000 dPa·s at 200° C. These values of the melt viscosity at 200° C. have been measured as set forth below. A sample dried to 0.1% or below in moisture was used. The viscosity when a polyester resin heated and stabilized at 200° C. was passed through a die having a hole diameter of 1.0 mm and a thickness of 10 mm under the pressure of 98 N/cm$^2$ with a flow tester available from Shimadzu Corporation (Part No. CFT-500C). Although high resin cohesive force and durability can be achieved when the melt viscosity becomes as high as 1000 dPa·s or above, there is a possibility of the component being fractured since injection molding of high pressure is required for molding of a sophisticated configuration. By using a polyester for molding having a melt viscosity of not more than 1000 dPa·s, preferably not more than 500 dPa·s, a molded component superior in electrical insulation can be obtained at a relatively low injection pressure of several hundred N/cm$^2$. The property of the electrical electronic component is not degraded. Although a lower value of melt viscosity at 200° C. is preferable, the lower limit is at least 5 dPa·s, preferably at least 10 dPa·s, more preferably at least 50 dPa·s, and most preferably at least 100 dPa·s taking into consideration the adhesion and cohesive force of the resin.

In order to conduct molding while minimizing thermal degradation of the polyester, rapid melting from 210° C. to 220° C. is required. Therefore, it is desirable that the upper limit of the melting point is 200° C. The upper limit is preferably 190° C., and more preferably 180° C. The lower limit is to be set to 5° C. to 10° C. higher than the heat resistant temperature required in the corresponding application. Taking into consideration the ease in handling at ordinary temperature and the normal heat resistance, the lower limit is at least 70° C., further preferably at least 100° C., more preferably at least 120° C., particularly preferably at least 140° C., and most preferably at least 150° C.

The tensile breaking strength and elongation of the polyester of the present invention were measured at 50% RH atmosphere at 23° C., based on a film formed product under thermal pressing. Specifically, a polyester resin dried to 0.1% or below in moisture was sandwiched between two polyethylene fluoride sheets and pressed for 10 seconds at 200° C., and then rapidly cooled down to ordinary temperature to obtain a polyester film. At this stage, it is desirable that a spacer, if necessary, is used to adjust the thickness to 0.2 mm. A sample 50 mm in length and 15 mm in width was cut out from such a film. The tensile breaking strength and elongation of the present invention were measured by subjecting this sample under the conditions of distance of 30 mm between the chucks and the tensile rate of 50 mm/min. in a 50% RH atmosphere at 23° C. Here, the product a×b is at least 500 where a (N/cm$^2$) is the tensile breaking strength and b (%) is the tensile breaking elongation. Preferably, the product a×b is at least 1000, further preferably at least 2000, and most preferably at least 2500. If the product a×b is less than 500, sufficient durability may not be achieved with respect to various impacts that will be received in various use conditions. Although the upper limit is not particularly limited, the upper limit is preferably not more than 20000, more preferably not more than 15000, and most preferably not more than 12000 taking into consideration the resin distortion towards the interior electronic component.

If the tensile breaking strength is too low, the electrical electronic component may not be held at the sufficient strength, inducing the possibility of being detached or the like. Preferably, the tensile breaking strength a is at least 2 (N/cm$^2$). Also, if the tensile breaking elongation is too low, the resin may be brittle and not capable of withstanding the mechanical load on the electrical electronic component, inducing the possibility of a crack or the like in the resin. Therefore, the tensile breaking elongation b is preferably at least 200 (%).

In order to express low melt viscosity that is absent in the general polyester such as PET and PBT in engineering plastics, as well as heat resistance and durability of a level equal to that of two-part epoxy resins, the aliphatic based and/or alicyclic and aromatic based compositions must be adjusted. For example, in order to retain high heat resistance of at least 150° C., a polyester copolymer based on terephthalic acid and ethylene glycol, terephthalic acid and 1,4-butanediol, naphthalene dicarboxylic acid and ethylene glycol, or naphthalene dicarboxylic acid and 1,4-butanediol is suitable. Since mold releasability due to rapid crystal solidification after molding is particularly desirable from the standpoint of productivity, the polyester copolymer is preferably based on terephthalic acid and 1,4-butanediol, or naphthalene dicarboxylic acid and 1,4-butanediol, both of rapid crystallization.

As to the terephthalic acid and naphthalene dicarboxylic acid, the sum of either one or both thereof is preferably at least 60 mole %, more preferably at least 70 mole %, and further preferably at least 80 mole % in the dicarboxylic acid component. Also, as to the ethylene glycol and 1,4-butanediol, the sum of either one or both is preferably at least 40 mole %, more preferably at least 45 mole %, further preferably at least 50 mole %, and most preferably at least 55 mole % in the diol component.

When the total sum of the entire dicarboxylic acid component and entire diol component is 200 mole %, the total amount of the terephthalic acid and 1,4-butanediol or the naphthalene dicarboxylic acid and 1,4-butanediol is preferably at least 120 mole %, more preferably at least 130 mole %, further preferably at least 140 mole %, and most preferably at least 150 mole %. If the total amount is less than 120 mole %, the crystallization rate is reduced, whereby the mold releasability will be degraded. Also, the total amount of the terephthalic acid and 1,4-butanediol or the naphthalene dicarboxylic acid and 1,4-butanediol is preferably not more than 180 mole %, and more preferably not more than 170 mole %. If the total amount thereof exceeds 180 mole %, the crystallization rate becomes so high that distortion during contraction easily occurs to reduce the adherence towards the electrical electronic component.

As a copolymer component applying adhesion to the base composition that achieves the above-described high heat resistance, an aliphatic or alicyclic dicarboxylic acid such as adipic acid, azelaic acid, sebacic acid, 1,4-cyclohexane dicarboxylic acid, 1,3-cyclohexane dicarboxylic acid, 1,2-cyclohexane dicarboxylic acid, 4-methyl-1,2-cyclohexane dicarboxylic acid, or an aliphatic or alicyclic diol such as 1,2-propanediol, 1,3-propanediol, 1,2-butanediol, 1,3-butanediol, 2-methyl-1,3-propanediol, 1,5-pentane diol, 1,6-hexane diol, 3-methyl-1,5-pentane diol, neopentyl glycol, diethylene glycol, dipropylene glycol, 2,2,4-trimethyl-1,3-pentane diol, cyclohexane dimethanol, tricyclodecane dimethanol, hydroxy pivalic acid neopentyl glycol ester, 1,9-nonane diol, 2-methyl octane diol, 1,10-dodecane diol, 2-butyl-2-ethyl-1,3-propane diol, and polyoxy methylene glycol can be enumerated.

By achieving copolymerization of an aliphatic or alicyclic dicarboxylic acid having at least 10 carbon atoms such as a dimer acid or hydrogenated dimer acid and a derivative thereof, or an aliphatic or alicyclic diol having at least 10 carbon atoms such as a dimer diol or hydrogenated dimer diol, the glass transition temperature can be lowered while maintaining the high melting point. Therefore, from the standpoint of achieving both heat resistance of the polyester resin and adherence towards the electrical electronic component, it is preferable that these are included as the dicarboxylic acid component or diol component in copolymerization. A derivative of the aliphatic or alicyclic dicarboxylic acid refers to a derivative of carboxylic acid and that can be a copolymer component, such as ester, acid chloride or the like.

In the present specification, a dimer acid refers to an aliphatic or alicyclic dicarboxylic acid generated by an unsaturated fatty acid being converted into a dimer by polymerization or Diels-Alder reaction and the like (in addition to most dimers, many include several mole % of a trimer, a monomer, or the like). A hydrogenated dimer acid refers to hydrogen added to the unsaturated bonding portion of the above dimer acid. A dimer diol or hydrogenated dimer diol refers to a reduction of the two carboxylic acids of the relevant dimer acid or hydrogenated dimer acid to hydroxyl groups. As a dimer acid or dimer diol, EMPOL or SOVERMOL from Cognis Corporation or PRIPOL from Uniqema can be enumerated.

A small amount of aromatic based copolymer component may also be used if the melt viscosity is maintained at a low range. For example, an aromatic dicarboxylic acid such as isophthalic acid and orthophthalic acid, and an aromatic based glycol such as ethylene oxide additions and propylene oxide additions of bisphenol A can be enumerated. From the standpoint of mold releasability, it is particularly preferable to introduce in blocks an aliphatic based component of relatively high molecular weight such as polytetramethylene glycol that exhibits rapid crystal solidification after molding. Also, copolymerization of a monomer that has a high molecule weight is preferable from the standpoint of facilitating rapid crystal solidification. Specifically, the above cited dimer acid, hydrogenated dimer acid, a derivative thereof, dimer diol, hydrogenated dimer diol and the like are suitable.

Introduction of such polymers in blocks improves the heat cycle durability due to reduction in the glass transition temperature as well as the hydrolyzable resistance due to reduction in the ester group concentration. Therefore, this approach is particularly preferable when durability after molding is important. In the present specification, "heat cycle durability" refers to the capability to be absent of resin delamination and resin cracks at the interface region with an electronic component or the like that differs in the coefficient of linear expansion when repeatedly subjected to temperature change between a high temperature and a low temperature. Delamination and generation of cracks will easily occur if the modulus of elasticity of the resin is increased during cooling. In order to provide a base material that can withstand the heat cycle, the glass transition temperature is preferably not more than −10° C., more preferably not more than −20° C., further preferably not more than −40° C., and most preferably not more than −50° C. Although the lower limit is not particularly cited, at least −100° C. can be cited for practical usage taking into consideration adhesion and the anti-blocking capability.

In order to achieve hydrolyzable resistance that can withstand the vapor of high temperature in view of the achievement of durability over a long period of time, it is desirable that the upper limit of the ester group concentration is not more than 8000 equivalents/$10^6$ g. The upper limit of the ester group concentration is preferably not more than 7500 equivalents/$10^6$ g, and more preferably not more than 7000 equivalents/$10^6$ g. In order to ensure the chemical resistance (gasoline, engine oil, alcohol, general purpose solvent and the like) as a polyester, it is desirable that the lower limit is at least 1000 equivalents/$10_6$ g. The lower limit is preferably at least 1500 equivalents/$10^6$ g, and more preferably at least 2000 equivalents/$10^6$ g. In the present specification, the ester group concentration is a value calculated from the composition and the copolymer ratio of the polyester resin represented in equivalent mole per 1000 kg of resin.

For the introduction of polymers in blocks, the dimer acid, hydrogenated dimer acid, dimer diol, hydrogenated dimer diol, polytetramethylene glycol and the like are preferably at least 2 mole %, more preferably at least 5 mole %, further preferably at least 10 mole %, and most preferably at least 20 mole %. The upper limit is not more than 70 mole %, preferably not more than 60 mole %, and more preferably not more than 50 mole % taking into consideration the heat resistance and handleability of blocking. The number-average molecular weight of the polytetramethylene glycol is preferably at least 400, more preferably at least 500, further preferably at least 600, and particularly preferably at least 700. The upper limit is preferably not more than 10000, more preferably not more than 6000, further preferably not more than 4000, and most preferably not more than 3000. If the number-average molecular weight of the polytetramethylene glycol is below 400, the heat cycle durability and hydrolyzable resistance may be degraded. In contrast, if the number-average molecular weight exceeds 10000, the compatibility with the polyester portion will be degraded to render copolymerization in blocks difficult.

The number-average molecular weight of polyester is preferably at least 3000, more preferably at least 5000, and further preferably at least 7000. The upper limit of the number-average molecular weight is preferably not more than 50000, more preferably not more than 40000, and further preferably not more than 30000. If the number-average molecular weight is below 3000, the product of a×b cannot easily satisfy the defined value. If the number-average molecular weight exceeds 50000, the melt viscosity at 200° C. may become higher.

The polyester resin for molding of the present invention is a saturated polyester resin that does not contain an unsaturated group. In the case of an unsaturated polyester, there is a possibility of crosslinking or the like occurring during melting to degrade the melt stability during molding.

As a method of determining the composition and composition ratio of the polyester resin of the present invention, $^1$H-NMR and $^{13}$C-NMR measuring a polyester resin dissolved in a solvent such as chloroform deuteride, an assay by gas chromatography that measures after methanolysis of the polyester resin and the like can be cited. Particularly, $^1$H-NMR is simple and convenient.

The well known methods can be employed for the preparation of the polyester resin of the present invention. For example, the polyester of interest can be obtained by subjecting the above dicarboxylic acid and diol component to an esterification reaction at 150° C. to 250° C., and then effecting polycondensation at 230° C. to 300° C. while reducing the pressure. Alternatively, the polyester of interest can be obtained by subjecting the above-described derivative of dimethyl ester of the dicarboxylic acid and the diol component to transesterification at 150° C. to 250° C., and then effecting polycondensation at 230° C. to 300° C. while reducing the pressure.

For the purpose of improving the adhesion, flexibility, durability and the like, the polyester resin for molding of the present invention can be blended with a polyester of another composition, another resin such as polyamide, polyolefine, epoxy, polycarbonate, acryl, ethylene vinyl acetate, phenol and the like, a curing agent such as an isocyanate compound, melamine, or the like, a filler such as talc and mica, a pigment such as carbon black, titanium oxide or the like, and a flame retardant such as antimony trioxide, polystyrene bromide or the like to be used in the application of molding as a resin composition. In this case, the polyester resin is included at least 50% by weight, more preferably at least 60% by weight, further preferably at least 70% by weight, and particularly preferably at least 90% by weight with respect to the entire composition. If the amount of the polyester is below 50% by weight, the fastening adhesion, various durability, water resistance for a good electrical electronic component, inherent to the polyester resin, may be degraded.

In the case where the polyester resin or resin composition of the present invention is exposed to high temperature for a long period of time for molding, it is preferable to add an antioxidant. For example, as a hindered phenol type, 1,3,5-tris(3,5-di-t-butyl-4-hydroxybenzyl)isocyanrate, 1,1,3-tri(4-hydroxy-2-methyl-5-t-butylphenyl)butane, 1,1-bis(3-t-butyl-6-methyl-4-hydroxyphenyl)butane, 3,5-bis (1,1-dimethyl ethyl)-4-hydroxy benzene propanoic acid, penta erytrityl tetrakis(3,5-di-t-butyl-4-hydroxyphenyl)propionate, 3-(1,1-dimethyl ethyl)-4-hydroxy-5-methyl-benzene propanoic acid, 3,9-bis[1,1-dimethyl-2-[(3-t-butyl-4-hydroxy-5-methylphenyl)propionyloxy]ethyl]-2,4,8,10-tetraoxaspiro[5.5]undecane, 1,3,5-trimethyl-2,4,6-tris(3',5'-di-t-butyl-4'-hydroxybenzyl)benzene, as a phosphorus type, 3,9-bis(p-nonyl phenoxy)-2,4,8,10-tetraoxa-3,9-diphosphaspiro[5.5]undecane, 3,9-bis(octadecyloxy)-2,4,8,10-tetraoxa-3,9-diphosphaspiro[5.5]undecane, tri(mononionylphenyl)phosphite, triphenoxy phosphine, isodecyl phosphite, isodecyl phenyl phosphite, diphenyl 2-ethylhexyl phosphite, dinonyl phenyl bis(nonylphenyl)ester phosphorus acid, 1,1,3-tris(2-methyl-4-ditridecyl phosphite-5-t-butylphenyl)butane, tris(2,4-di-t-butylphenyl)phosphite, pentaerythritol bis (2,4-di-t-butylphenyl phosphite), 2,2'-methylene bis(4,6-di-t-butylphenyl) 2-ethylhexyl phosphite, bis(2,6-di-t-butyl-4-methylphenyl)pentaerythritol diphosphite, and as a thioether type, 4,4'-thiobis[2-t-butyl-5-methylphenol]bis[3-(dodecylthio)propionate], thiobis[2-(1,1-dimethylethyl)-5-methyl-4,1-phenylene]bis [3-(tetradecylthio)-propionate], pentaerythritol tetrakis(3-n-dodecylthio propionate), bis (tridecyl)thiodipropionate can be enumerated, all which can be used singularly, or in composite. The added amount thereof is preferably at least 0.1% and not more than 5%. If the added amount is less than 0.1%, the effect of preventing thermal degradation will be inferior. If the added amount exceeds 5%, the adhesion or the like may be adversely affected.

It is desirable that the retention of the melt viscosity of the polyester resin composition of the present invention after a heat treatment test for 100 hours at 121° C. and 0.2 MPa is at least 70% to the melt viscosity prior to being subjected to the heat treatment test. In the heat treatment test of the present invention, a resin or a composition thereof for molding is cut to a dimension of 1 cm×1 cm×1 cm, and processed under the condition of 121° C.×0.2 MPa×100 hours. The melt viscosity retention thereof is preferably at least 75%, more preferably at least 80%, and most preferably at least 90%. There is no restriction in the upper limit, and a value closer to 100% is favorable. If the retention of the melt viscosity is below 70%, the durability when used at high temperature may be degraded.

The polyester resin or resin composition for molding of the present invention is poured into a die in which an electrical electronic component is set and then molded. More specifically, the polyester resin or resin composition of the present invention is heated in a heat tank at approximately 130-220° C. to melt, poured into a die through an injection nozzle, cooled down for a predetermined period of time, and then taken out from the die as a formed product.

Although the equipment for molding is not particularly limited, Mold-man 8000 available from The Cavist Corporation of USA, WS 102/MX3006 available from Nordson Corporation of Germany, and DYNAMELT series available from ITW Dynatec of USA can be cited.

The present invention will be described in further detail based on examples. Respective measurements in the examples have been obtained as set forth below. The ester group concentration is a value calculated from the composition and copolymer ratio of the polyester resin represented in equivalent mole per 1000 kg of resin.

MELTING POINT, GLASS TRANSITION TEMPERATURE: Using a differential scanning colorimeter "DSC220 Type" available from Seiko Instruments Inc., an under-measurement specimen 5 mg was placed in an aluminum pan and sealed with the lid pressed. The specimen was held for five minutes at 250° C. to be completely melted, and then rapidly cooled with liquid nitrogen, followed by an increase in temperature from −150° C. to 250° C. at the rate of 20° C./min. for measurement. The inflection point of the obtained curve was taken as the glass transition temperature, and the endothermic peak was taken as the melting point.

MELT VISCOSITY: Using a flow tester (CFT-500C type) available from Shimadzu Corporation, a cylinder located at the center of a heating unit set to 200° C. was filled with a resin specimen dried to 0.1% or below in moisture. At an elapse of one minute after the filling, a load (98 N) was applied on the specimen by means of a plunger, whereby the melted specimen is extruded from the die at the bottom of the cylinder (hole diameter: 1.0 mm; thickness: 10 mm). The dropping distance and dropping time of the plunger were recorded to calculate the melt viscosity.

TENSILE BREAKING STRENGTH, TENSILE BREAKING ELONGATION: A polyester sheet (width 15 mm, thickness 0.2 mm, length 50 mm) was prepared. The tensile breaking strength and tensile breaking elongation at 23° C. and 50% RH were measured using a tensile tester under the conditions of distance of 30 mm between the chucks and a tensile rate of 50 mm/min.

NUMBER-AVERAGE MOLECULAR WEIGHT: Using a gel permeation chromatography (GPC) 150c from Waters Corporation with a chloroform as an eluate, GPC measurement was conducted at the column temperature of 35° C. and flow rate of 1 cm$^3$/min. Based on calculation from the results, the measured value converted in polystyrene was obtained.

PREPARATION OF POLYESTER RESIN

A polyester resin (A) was obtained as set forth below. In a reactor equipped with an agitator, a thermometer and a cooler for distillation, 166 weight parts of terephthalic acid, 180 weight parts of 1,4-butanediol, and 0.25 weight parts of tetrabutyl titanate were added and subjected to esterification for 2 hours at 170-220° C. After esterification is completed, 300 weight parts of polytetramethylene glycol "PTMG1000" (product of Mitsubishi Chemical) with a number-average molecular weight of 1000 and 0.5 weight parts of a hindered phenol based antioxidant "Irganox1330" (Ciba-Geigy Ltd.) were introduced. The temperature was raised up to 255° C. while the interior was gradually reduced in pressure to achieve 665 Pa at 255° C. in 60 minutes. Then, a polycondensation reaction was effected for 30 minutes at 133 Pa or below. This obtained polyester resin (A) had a melting point of 165° C. and a melt viscosity of 250 dPa·s.

Polyester resins (B) to (K) were synthesized in a manner similar to that of the above polyester resin (A). Respective compositions and values of physical properties are shown in Table 1.

Polyester resins (A) to (H) satisfy the requirements of the claims. Polyester resin (I), polyester resin (J), and polyester resin (K) do not satisfy the requirements of the claims in the melt viscosity at 200° C., the product of the tensile breaking strength and tensile breaking elongation, and the melt viscosity at 200° C. as well as the product of the tensile breaking strength and tensile breaking elongation, respectively. Polyester resin (K) was used as the material to fabricate a polyester resin composition that will be described afterwards.

TABLE 1

| | Polyester Resin | | A | B | C | D | E | F | G | H | I | J | K |
|---|---|---|---|---|---|---|---|---|---|---|---|---|---|
| Composition (mole %) | Dicarboxylic acid component | TPA | 100 | | | 70 | 70 | 75 | 100 | 80 | 75 | 65 | 50 |
| | | NDCA | | 100 | 100 | | | | | | | | |
| | | IPA | | | | 30 | 30 | | | | 25 | 10 | 50 |
| | | AA | | | | | | | | | | 25 | |
| | | DIA | | | | | | 25 | | | | | |
| | | DDA | | | | | | | | 20 | | | |
| | Diol component | BD | 70 | 60 | 60 | 90 | | 100 | 75 | 100 | 100 | 100 | |
| | | EG | | | | | 90 | | | | | | 50 |
| | | PTG1000 | 30 | 40 | | 10 | 10 | | | | | | |
| | | PTG2000 | | | 40 | | | | | | | | |
| | | DID | | | | | | | | 25 | | | |
| | | NPG | | | | | | | | | | | 50 |
| Resin Physical Properties | Melt viscosity (dPa · s, 200° C.) | | 250 | 500 | 500 | 600 | 800 | 500 | 400 | 700 | 1500 | 300 | 3.5 |
| | Melting point (° C.) | | 160 | 160 | 159 | 154 | 164 | 174 | 173 | 194 | 185 | 165 | none (amorphous) |
| | Glass transition temperature (° C.) | | −65 | −70 | −75 | −60 | −50 | −45 | −45 | −24 | 25 | −5 | 55 |
| | Ester group concentration (equivalent/10$^6$ g) | | 4000 | 3100 | 1900 | 6400 | 7000 | 6300 | 5900 | 8600 | 9000 | 9300 | 9400 |
| | Tensile breaking strength (N/mm$^2$) | | 7 | 4 | 6 | 10 | 20 | 6 | 6 | 20 | 35 | 15 | 30 *1) |
| | Tensile breaking elongation (%) | | 400 | 1000 | 1100 | 500 | 500 | 300 | 450 | 55 | 50 | 26 | 5 *1) |

TABLE 1-continued

| Polyester Resin | A | B | C | D | E | F | G | H | I | J | K |
|---|---|---|---|---|---|---|---|---|---|---|---|
| Product a × b | 2800 | 4000 | 6600 | 5000 | 10000 | 1800 | 2700 | 1100 | 1750 | 390 | 150 |
| Number-average molecular weight | 20000 | 25000 | 35000 | 28000 | 35000 | 30000 | 27000 | 26000 | 30000 | 7000 | 2200 |

*1) measured using sample of 2 mm in thickness
The abbreviations in Table 1 are as follows:
TPA: Terephthalic acid;
NDCA: naphthalene dicarboxylic acid;
IPA: isophthalic acid;
AA: adipic acid;
DIA: hydrogenated dimer acid;
DDA: dodecane dicarboxylic acid;
BD: 1,4-butanediol;
EG: ethylene glycol;
PTG1000: polytetramethylene glycol (number-average molecular weight of 1000);
PTG2000: polytetramethylene glycol (number-average molecular weight of 2000);
DID: hydrogenated dimerdiol;
NPG: neopentyl glycol.

PREPARATION OF POLYESTER RESIN COMPOSITION

A polyester resin composition (M) was prepared as set forth below. 76 weight parts of polyester resin (A), 6 weight parts of antimony trioxide and 18 weight parts of poly styrene dibromide as a flame retardant were mixed uniformly, and then melted and kneaded at a die temperature of 170° C. using a two-shaft extruder.

Polyester resin compositions (N) to (S) were prepared in a manner similar to that of the above polyester resin composition (M). Respective compositions and values of physical properties are shown in Table 2.

Polyester resin compositions (M) to (Q) satisfy the requirements of the claims. Polyester resin composition (R) does not satisfy the requirements of the claims in the type of the polyester resin and the product of the tensile breaking strength and tensile breaking elongation. Polyester resin composition (S) does not satisfy the requirements of the claims in the polyester resin ingredient ratio and the product of the tensile breaking strength and tensile breaking elongation.

Then, ten types of the resins for molding, namely polyester resins (A) to (J) and a dimer acid based polyamide resin were melted at 200° C., and subjected to injection molding using an applicator "WS 102/MX3006" available from Nordson Corporation for low pressure (up to 300 N/cm$^2$) injection molding. The material to be molded was molded over a circuit board of 20 mm×15 mm with two lead wires of polyvinyl chloride in an aluminum die having an inside dimension of 25 mm×20 mm×50 mm. The period of time of release from the die without any defect in the shape of the formed product (mold release time) and the formed state corresponding to the circuit board were observed. The circuit board was left for 100 hours at 80° C.×95% RH. The retention of the circuit resistance was measured. A higher retention indicates its higher suitability for the insulation material of an electrical electronic component. Also, each resin sample was subjected to a pressure cooker test (121° C., 0.2 MPa, 100 hours), and the retention of melt viscosity was obtained. The hydrolyzable resistance of the polyester resin became lower in proportion to a lower retention, having the tendency of degradation in the durability over a long period of time. Furthermore, the appearance of the

TABLE 2

| | Polyester Resin Composition | | M | N | O | P | Q | R | S |
|---|---|---|---|---|---|---|---|---|---|
| Composition (wt %) | Polyester resin | A | 76 | 98.5 | 95 | 64 | 66 | | 26 |
| | | J | | | | | | 40 | 62 |
| | | K | | | | 36 | 32.5 | | |
| | Epoxy resin | Epikote1004 *2) | | | 5 | | | | |
| | Flame-retardant | Antimony trioxide (Pyroguard *3) | 6 | | | | | 15 | 3 |
| | | Poly styrene dibromide (PDBS-80 *4) | 18 | | | | | 45 | 9 |
| | Anti-oxidant | ADK Stab AO-60 *5) | | 1.0 | | | 1.0 | | |
| | | ADK Stab AO-412S *6) | | 0.5 | | | 0.5 | | |
| Resin Physical Properties | Melt viscosity (dPa · s, 200° C.) | | 400 | 250 | 220 | 200 | 200 | 500 | 270 |
| | Tensile breaking strength (N/mm$^2$) | | 7 | 7 | 7 | 6 | 6 | 9 | 10 |
| | Tensile breaking elongation (%) | | 250 | 400 | 400 | 200 | 220 | 15 | 40 |
| | Product a × b | | 1750 | 2800 | 2800 | 1200 | 1320 | 135 | 400 |

*2) Yuka Shell Epoxy KK
*3) Dai-Ichi Kogyo Seiyaku Pyroguard AN-800
*4) Great Lakes Chemical Corp.
*5) Asahi Denka Kogyo <pentaerythritol tetrakis(3-(3,5-di-tert-butyl-4-hydroxyphenyl)propionate)>
*6) Asahi Denka Kogyo <2,2-bis[[3-(dodecylthio)-1-oxopropoxy]methyl]propane-1,3-diyl bis[3-(dodecylthio)propionate]> formed product after a heat cycle test (twenty times from −40° C. to 80° C. was observed). The results are shown in Table 3.

The retention of the melt viscosity before and after the heat treatment test was obtained as set forth below. A sample of 1 cm×1 cm×1 cm was cut out and processed by a pressure cooker tester TTC-411 Type available from TABAI ESPEC Corporation. The retention was obtained comparing the melt viscosity before and after the heat treatment test. Measurement of the melt viscosity was carried out as described above.

ucts using polyester resin compositions (R) and (S) that do not satisfy the requirements of the claims exhibited considerable degradation.

Although the present invention has been described and illustrated in detail, it is clearly understood that the same is by way of illustration and example only and is not to be taken by way of limitation, the spirit and scope of the present invention being limited only by the terms of the appended claims.

TABLE 3

|  | Mold Material | Mold release time (second) | Forming workability | Appearance of formed product | Retention of circuit resistance | Retention of melt viscosity | Appearance after heat cycle |
|---|---|---|---|---|---|---|---|
| Example 1 | Polyester resin A | 3 | good | good | 98% | 99% | good |
| Example 2 | Polyester resin B | 7 | good | good | 98% | 99% | good |
| Example 3 | Polyester resin C | 10 | good | good | 98% | 100% | good |
| Example 4 | Polyester resin D | 5 | good | good | 98% | 98% | good |
| Example 5 | Polyester resin E | 15 | good | good | 98% | 97% | good |
| Example 6 | Polyester resin F | 10 | good | good | 95% | 98% | good |
| Example 7 | Polyester resin G | 10 | good | good | 99% | 98% | good |
| Example 8 | Polyester resin H | 3 | good | good | 72% | 75% | small crack |
| Comparative Example 1 | Polyester resin I | 4 | nozzle clogging in forming line | defect in formed product | 99% | 65% | crack |
| Comparative Example 2 | Polyester resin J | 5 | good | crack after cooling | 0% | 20% | crack |
| Comparative Example 3 | Polyamide resin | 15 | good | good | 10% | 98% | coloring (black) |

A formed product was produced in a manner as described above for each of polyester resin compositions (M) to (S). The mold release time, forming workability, appearance of the formed product, retention of the circuit resistance, retention of the melt viscosity, and the appearance after the heat cycle were observed. The results are shown in Table 4.

TABLE 4

|  | Mold Material | Mold release time (second) | Forming workability | Appearance of formed product | Retention of circuit resistance | Retention of melt viscosity | Appearance after heat cycle |
|---|---|---|---|---|---|---|---|
| Example 9 | Polyester resin M | 4 | good | good | 98% | 99% | good |
| Example 10 | Polyester resin N | 3 | good | good | 99% | 100% | good |
| Example 11 | Polyester resin O | 5 | good | good | 99% | 100% | good |
| Example 12 | Polyester resin P | 8 | good | good | 97% | 97% | good |
| Example 13 | Polyester resin Q | 8 | good | good | 98% | 99% | good |
| Comparative Example 4 | Polyester resin R | 4 | good | crack after cooling | 0% | 10% | crack |
| Comparative Example 5 | Polyester resin S | 4 | good | good | 0% | 10% | crack |

It is appreciated from Tables 1 and 3 that the properties of the formed products using polyester resins (A) to (H) satisfying the requirements of the claims were all favorable. However, the characteristics of the formed products using polyester resins (I) and (J) and a polyamide resin that do not satisfy the requirements of the claims exhibited great degradation.

Furthermore, it is appreciated from Tables 2 and 4 that the properties of formed products using polyester resin compositions (M to (Q) satisfying the requirements of the claims were all favorable. However, the properties of formed prod-

What is claimed is:

1. A method for fabricating a product by molding, comprising:

melting a resin for molding; and injection-molding said melted resin for molding at a pressure of 10 N/cm² to 800 N/cm² in a mold cavity in which an electrical or electronic component is set to encapsulate said component, wherein said resin for molding is a saturated polyester resin having a melt viscosity at 200° C. of at least 5 dPa·s and not more than 1000 dPa·s, and a product a×b of at least 500 where a (N/mm²) is a tensile breaking strength and b (%) is a tensile breaking elongation of a film shaped product formed from the resin; and said saturated polyester resin comprises at least 60 mole % of a terephthalic acid or naphthalene dicarboxylic acid in a dicarboxylic acid component of the polyester, and at least 40 mole % of a 1,4-butanediol or ethylene glycol in a diol component of the polyester based on the respective total amounts of the dicarboxylic acid component and the diol component of the polyester.

2. The method of claim 1, wherein said saturated polyester resin has a glass transition temperature of not more than −10° C. and a melting point of at least 70° C. and not more than 200° C.

3. The method of claim 1, wherein said saturated polyester resin has an ester group concentration of at least 1000 equivalents/$10^6$ g and not more than 8000 equivalents/$10^6$ g.

4. The method of claim 1, wherein said saturated polyester resin comprises at least 2 mole % of polyalkylene glycol in a diol component of the polyester based on the total amount of the diol component of the polyester.

5. The method of claim 4, wherein said polyalkylene glycol is a polytetramethylene glycol having a number-average molecular weight of at least 400 and not more than 10000.

6. The method of claim 1, wherein said saturated polyester resin comprises at least 2 mole % of an aliphatic or alicyclic diol having at least 10 carbon atoms in a diol component of the polyester based on the total amount of the diol component of the polyester.

7. The method of claim 1, wherein said saturated polyester resin comprises at least 2 mole % of an aliphatic or alicyclic dicarboxylic acid having at least 10 carbon atoms in a dicarboxylic acid component of the polyester based on the total amount of the dicarboxylic acid component of the polyester.

8. A method for fabricating a product by molding, comprising:
melting a resin for molding; and
injection molding said melted resin for molding at a pressure of 10 N/cm$^2$ to 800 N/cm$^2$ in a mold cavity in which an electrical or electronic component is set to encapsulate said component,
wherein said resin for molding is a polyester resin composition comprising at least 50% by weight of the saturated polyester resin defined in any of claims 1-7 based on the entire composition.

9. A method for fabricating a product by molding, comprising:
melting a resin for molding; and
injection molding said melted resin for molding at a pressure of 10 N/cm$^2$ to 800 N/cm$^2$ in a mold cavity in which an electrical or electronic component is set to encapsulate said component,
wherein said resin for molding is a polyester resin composition comprising the saturated polyester resin defined in any of claims 1-7 and an antioxidant.

10. A method for fabricating a product by molding, comprising:
melting a resin for molding; and
injection molding said melted resin for molding at a pressure of 10 N/cm$^2$ to 800 N/cm$^2$ in a mold cavity in which an electrical or electronic component is set to encapsulate said component,
wherein said resin for molding is a polyester resin composition having a melt viscosity at 200° C. of at least 5 dPa·s, and not more than 1000 dPa·s, and a product a×b of at least 500 where a (N/mm$^2$) is a tensile breaking strength and b (%) is a tensile breaking elongation of a film shaped product formed from the resin;
said polyester resin composition comprises at least 50% by weight of a saturated polyester resin based on the entire composition; and
said saturated polyester resin comprises at least 60 mole % of a terephthalic acid or naphthalene dicarboxylic acid in a dicarboxylic acid component of the polyester, and at least 40 mole % of a 1,4-butanediol or ethylene glycol in a diol component of the polyester based on the respective total amounts of the dicarboxylic acid component and the diol component of the polyester.

11. The method of claim 10, wherein said polyester resin composition has a retention of melt viscosity after a heat treatment test at 121° C. and 0.2 MPa for 100 hours of at least 70% compared to the melt viscosity before being subjected to said thermal treatment test.

12. A method for fabricating a product by molding, comprising:
melting a resin for molding; and
injection molding said melted resin for molding at a pressure of 10 N/cm$^2$ to 800 N/cm$^2$ in a mold cavity in which an electrical or electronic component is set to encapsulate said component,
wherein said resin for molding is a polyester resin composition having a melt viscosity at 200° C. of at least 5 dPa·s, and not more than 1000 dPa·s, and a product a×b of at least 500 where a (N/mm$^2$) is a tensile breaking strength and b (%) is a tensile breaking elongation of a film shaped product formed from the resin; said polyester resin composition comprises a saturated polyester resin and an antioxidant; and said saturated polyester resin comprises at least 60 mole % of a terephthalic acid or naphthalene dicarboxylic acid in a dicarboxylic acid component of the polyester, and at least 40 mole % of a 1,4-butanediol or ethylene glycol in a diol component of the polyester based on the respective total amounts of the dicarboxylic acid component and the diol component of the polyester.

13. The method of claim 12, wherein said polyester resin composition has a retention of melt viscosity after a heat treatment test at 121° C. and 0.2 MPa for 100 hours of at least 70% compared to the melt viscosity before being subjected to said thermal treatment test.

* * * * *